US012182108B2

(12) United States Patent
Sammons

(10) Patent No.: US 12,182,108 B2
(45) Date of Patent: Dec. 31, 2024

(54) AUTOMATIC GOTO ROUTING IN PROCESS FLOW GENERATION

(71) Applicant: salesforce.com, inc., San Francisco, CA (US)

(72) Inventor: Brady Sammons, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 80 days.

(21) Appl. No.: 17/455,180

(22) Filed: Nov. 16, 2021

(65) Prior Publication Data

US 2023/0153294 A1 May 18, 2023

(51) Int. Cl.
*G06F 16/24* (2019.01)
*G06F 8/34* (2018.01)
*G06F 16/23* (2019.01)
*G06F 16/242* (2019.01)

(52) U.S. Cl.
CPC ............ *G06F 16/2423* (2019.01); *G06F 8/34* (2013.01); *G06F 16/235* (2019.01)

(58) Field of Classification Search
CPC ............................ G06F 16/235; G06F 16/2423
USPC .......................................................... 707/708
See application file for complete search history.

(56) References Cited

U.S. PATENT DOCUMENTS

| 2016/0225172 A1* | 8/2016 | Calahan | G06T 11/60 |
| 2016/0249084 A1* | 8/2016 | Kates | H04N 21/2547 |

* cited by examiner

*Primary Examiner* — Hosain T Alam
*Assistant Examiner* — Tracy M McGhee
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to creating routing connections between graphical elements in a process flow. A computer system may provide process flow information that is executable by a client system to display a graphical user interface (GUI) associated with a process diagram flow. The client system may be able to output, via the GUI, a graphical representation of the process flow. The graphical representation may include graphical elements indicative of process steps and graphical connections between the graphical elements. Via the GUI on the client system, a user may request a graphical connection going from a first graphical element to a second graphical element. The computer system may update the process diagram with the graphical connection where the graphical connection is routed based on a predetermined set of connection rules for the process diagram.

19 Claims, 10 Drawing Sheets

AUTOMATIC GOTO ROUTING IN PROCESS FLOW GENERATION

BACKGROUND

Technical Field

This disclosure relates generally to computer systems and, more specifically, to various mechanisms for implementing routing connections between elements in process flows.

Description of the Related Art

Software as a service (SaaS) describes a software distribution model in which providers maintain applications in a centrally-hosted fashion and make them available to end users over the internet as services. Such services can include customer relationship management services, web hosting and e-commerce services, storage services, email services, and communication-services. In some cases, a service allows users to develop, run, and manage applications using tools that are provided by the service. One type of application that may be developed by a user is a process flow that implements particular logic defined by the user. For example, a user may create a process flow that accesses records from a database, performs a set of computations on the data of those records, and then returns a result to the user.

DETAILED DESCRIPTION

Figure 1:
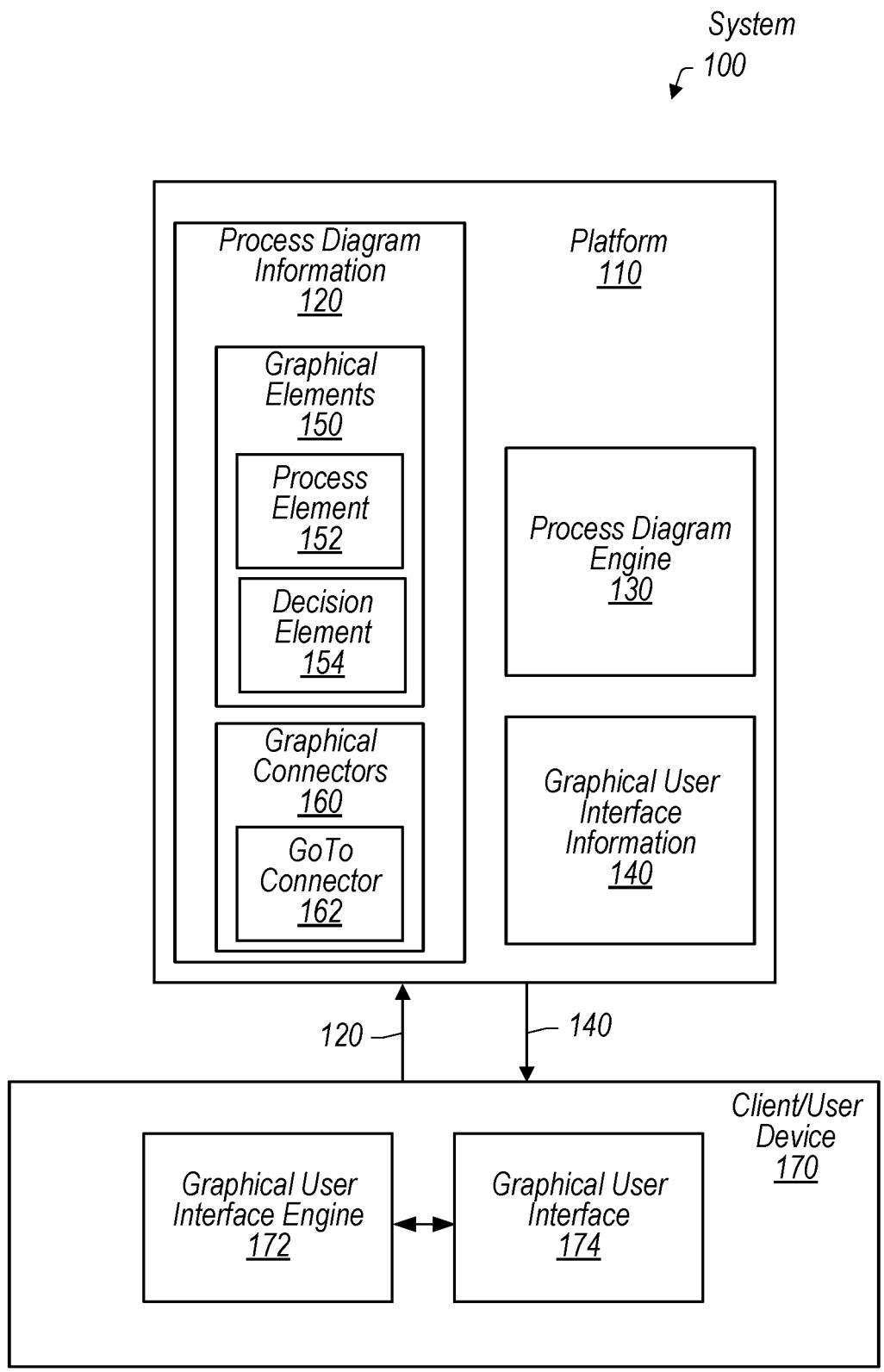
FIG. 1 depicts a block diagram of a system 100, according to some embodiments.

A service that allows users to create applications often provides tools that enable those users to create the applications without requiring an extensive knowledge of programming. An example tool is a graphical user interface (GUI) that provides a canvas on which users can place elements that define the logic (e.g., process steps) of an application or process, thereby allowing a user to build code-like logic to describe a process flow (e.g., a process diagram flow or workflow) without having to write code. In various instances, users place elements using a freeform editor that helps to place connections between the various elements. Process flows may, however, become complex with a large number of elements and paths (e.g., connections) between the elements. As the process flow complexity increases, a user may become overwhelmed or have difficulty in understanding a process flow generated using the freeform editor.

To overcome the issues related to use of a freeform editor, developments have been made to provide a more structured process for generating process flows. For instance, an autolayout environment (e.g., a "fixed" autolayout canvas) may be implemented to provide a structured process for generating process flows. In an autolayout environment, the process flow creator (e.g., a user) is no longer allowed to drag and drop elements anywhere within the process flow canvas as is allowed by a freeform editor. Rather, in the autolayout environment, the process flow creator is limited to placing elements and routing between elements according to predetermined rules for the layout. For instance, as described herein, the placement of elements and routing between elements may be limited based on spacing or boundary rules described according to numbers of pixels. In various embodiments, pixel numbers can be represented as a grid representation overlaying the process flow (e.g., a fixed grid representation overlaying the process flow) in the GUI. The predetermined rules for the placement and routing of the elements may be restricted or limited according to specific rules determined by a creator (e.g., developer) of the autolayout environment.

In various instances, a user may desire to implement GoTo routing between graphical elements in a process flow being created by the user. As used herein, the term "GoTo" routing refers to a direct graphical connection between two graphical elements in a graphical representation of a process diagram (e.g., process diagram flow) without any additional elements along the graphical connection. For instance, GoTo routing may provide a direct connection (e.g., route) between a first graphical element and a second graphical element in the process flow where there are no additional graphical elements or any branches along the route between the first graphical element and the second graphical element represented by the GoTo routing. GoTo routes may be added to a process flow, for example, to provide direct routing from a downstream element to an upstream element or an element in one branch to another element in another branch in the process flow. The present disclosure addresses, among other things, the problem of how to enable and provide GoTo routing in autolayout environments for generating process flows that is easily implemented and simple to understand for a user viewing the process flow.

In various embodiments described herein, a system provides a GoTo selector element that can be used in building an application, such as a process diagram flow or workflow, being generated in an autolayout environment. For example, a user may be presented, by a GUI, a display of a process flow being created by the user within an autolayout environment. The GUI may enable selection by the user of a GoTo route originating from an element in the process flow. Upon selection by the user, the GoTo route may be created according to a set of predetermined rules (e.g., a predetermined set of connection rules) for GoTo routing in the autolayout environment. The predetermined rules for GoTo routing in the autolayout environment may include, for example, rules determining selection of elements in a process flow for GoTo routes along with rules for determining routing paths between elements through a grid representation of the process flow.

In certain embodiments, for instance, after the selection of an initial element for GoTo routing, the autolayout environment only enables the selection of specific elements for the GoTo route by the user based on the predetermined rules for GoTo routing. In various embodiments, after selection of two elements for the GoTo route, the autolayout environment may invoke the predetermined rules for GoTo routing to create a path for the GoTo route between the elements in the process flow. The created GoTo route may be presented by the GUI in the display of the process flow. Additional rules may also be applied when multiple GoTo elements are created in the process flow. For example, rules may be applied that determine the collapsing or expansion of connectors within the process flow when multiple GoTo routes are directed to a single element. After the process flow has been built by the user according to the predetermined rules for the autolayout environment, the process flow may be compiled into a form that can be processed by the system.

The above-described techniques may be advantageous over conventional approaches for process flow routing as the techniques allow for creation and display of process flows with GoTo routing in an autolayout environment. Consequently, a process flow creator may generate a process flow having any number of GoTo routes that is simple to understand and readily viewable by a user. Additionally, by applying predetermined rules to the creation of GoTo routes, the process flow creator is prevented from generating unusable or non-implementable process flows. Yet further, applying the predetermined rules for creation of the GoTo routes may prevent the user/creator from having to redraw any existing GoTo routes when placing a new GoTo route in a process flow. An exemplary application of these techniques will now be discussed, starting with reference to FIG. 1.

FIG. 1 depicts a block diagram of a system 100, according to some embodiments. System 100 includes a set of components that may be implemented via hardware or a combination of hardware and software. In the illustrated embodiment, system 100 includes a platform 110 that is coupled to a client/user device 170 (e.g., via the Internet). As further shown, platform 110 includes process diagram information 120, process diagram engine 130, and graphical user interface (GUI) information 140. As shown, process diagram information 120 includes a set of graphical elements 150 and graphical connectors 160. In some embodiments, system 100 is implemented differently than shown. For example, process diagram information 120 and/or GUI information 140 may be stored at a location that is external to platform 110.

Platform 110, in various embodiments, implements a platform service (e.g., a customer relationship management (CRM) platform service) that allows users of that service to develop, run, and manage applications. Platform 110 may be a multi-tenant system that provides various functionality to users/tenants/clients that are hosted by the multi-tenant system. Accordingly, platform 110 may execute software routines from various, different users (e.g., providers and tenants of platform 110) as well as provide code, web pages, and other data to users, databases, and other entities of platform 110. In various embodiments, platform 110 is implemented using a cloud infrastructure that is provided by a cloud provider. Process diagram engine 130 may thus execute on and use the available cloud resources of the cloud infrastructure (e.g., computing resources, storage resources, network resources, etc.) to facilitate its operation. For example, process diagram engine 130 may execute in a virtual environment hosted on server-based hardware included in a datacenter of the provider. But in some embodiments, platform 110 is implemented utilizing local or private infrastructure as opposed to a public cloud.

Process diagram information 120, in various embodiments, is information that specifies a process diagram (e.g., a process flow diagram or workflow diagram) defining an ordering of graphical elements 150 and graphical connectors 160 connecting those elements 150 to one another. Process diagram information 120 may be derived from user input provided to GUI engine 172 that is rendered on GUI 174 on client/user device 170 (e.g., on a display of the device). Process diagram information 120 may include a portion comprising an executable form of the process flow and a portion that can be interpreted by GUI engine 172 to present a graphical representation of the process flow diagram on GUI 174. In various embodiments, process diagram information 120 is sent to process diagram engine 130 to execute the corresponding process diagram flow in response to a request or a trigger event. Process diagram information 120 may also be provided to client/user device 170 when a user desires to view and/or modify the process diagram flow. In some embodiments, the above-mentioned portions of process diagram information 120 are stored separately and/or can be accessed separately (e.g., the executable form of a process flow might not be sent to client/user device 150).

As described herein, a process diagram flow can include graphical elements 150 and graphical connectors 160. A graphical element 150, in various embodiments, corresponds to a stage within the process diagram flow and may define a set of actions to be performed as a part of processing that graphical element 150. In the illustrated embodiment, examples of graphical elements 150 include process elements 152 and decision elements 154. Graphical elements 150 may also include numerous types of graphical elements used in a process flow including, but not limited to, data processing elements, data request elements, data presentation elements, and fault elements. Once graphical element 150 has been processed, the corresponding process diagram flow may be traversed to reach another graphical element 150 via a graphical connector 160 that connects the two elements 150.

In certain embodiments, two graphical elements 150 are connected via a "GoTo" graphical connector 162. As described above, GoTo graphical connector 162 may be a direct graphical connector between two graphical elements 150 in process diagram information 120. In various embodiments, GoTo graphical connector 162 is associated with a predetermined set of connection rules defining how the GoTo graphical connector can be implemented in process diagram information 120. For instance, predetermined rules may limit the selection of graphical elements 150 for a GoTo graphical connector 162 or define how a GoTo graphical connector 162 is routed in a process diagram defined by process diagram information 120. Examples of process diagram flows that include GoTo graphical connectors 162 and implementation of the GoTo graphical connectors according to a set of predetermined connection rules are discussed in greater detail herein.

Process diagram engine 130, in various embodiments, facilitates the execution of a process diagram flow that is defined by process diagram information 120. As described above, process diagram information 120 may include an executable form of the process diagram flow that is provided to process diagram engine 130. Accordingly, process diagram engine 130 may execute that executable form to perform the process diagram flow.

GUI information 140, in various embodiments, includes information that is executable to render a GUI that can be used to build process diagram flows. As illustrated, GUI information 140 is provided to GUI engine 172 on client/user device 170. GUI engine 172 may render GUI 174 to a requesting user based on GUI information 140. As discussed in more detail with respect to FIG. 2, the GUI presents selectable elements 150 that can be positioned in a graphical representation of a process diagram flow during build of the process diagram flow. Also, as discussed with respect to FIG. 3, the GUI may present additional interfaces that enable a user to configure graphical elements 150 or graphical connectors 160 that have been added to a process flow. For example, GUI 174 may present an interface that enables a user to specify a particular graphical element 150 as the return point of GoTo connector 162. In various embodiments, GUI information 140 includes information that is executable to generate process diagram information 120 according to a process diagram flow being built by a user using GUI 174. Consequently, a user may select a save and/or compile option to cause client/user device 170 to create process diagram information 120, which may include the executable form of the process diagram flow. Client/user device 170 can then provide process diagram information 120 to platform 110, as shown in FIG. 1.

Figure 2:
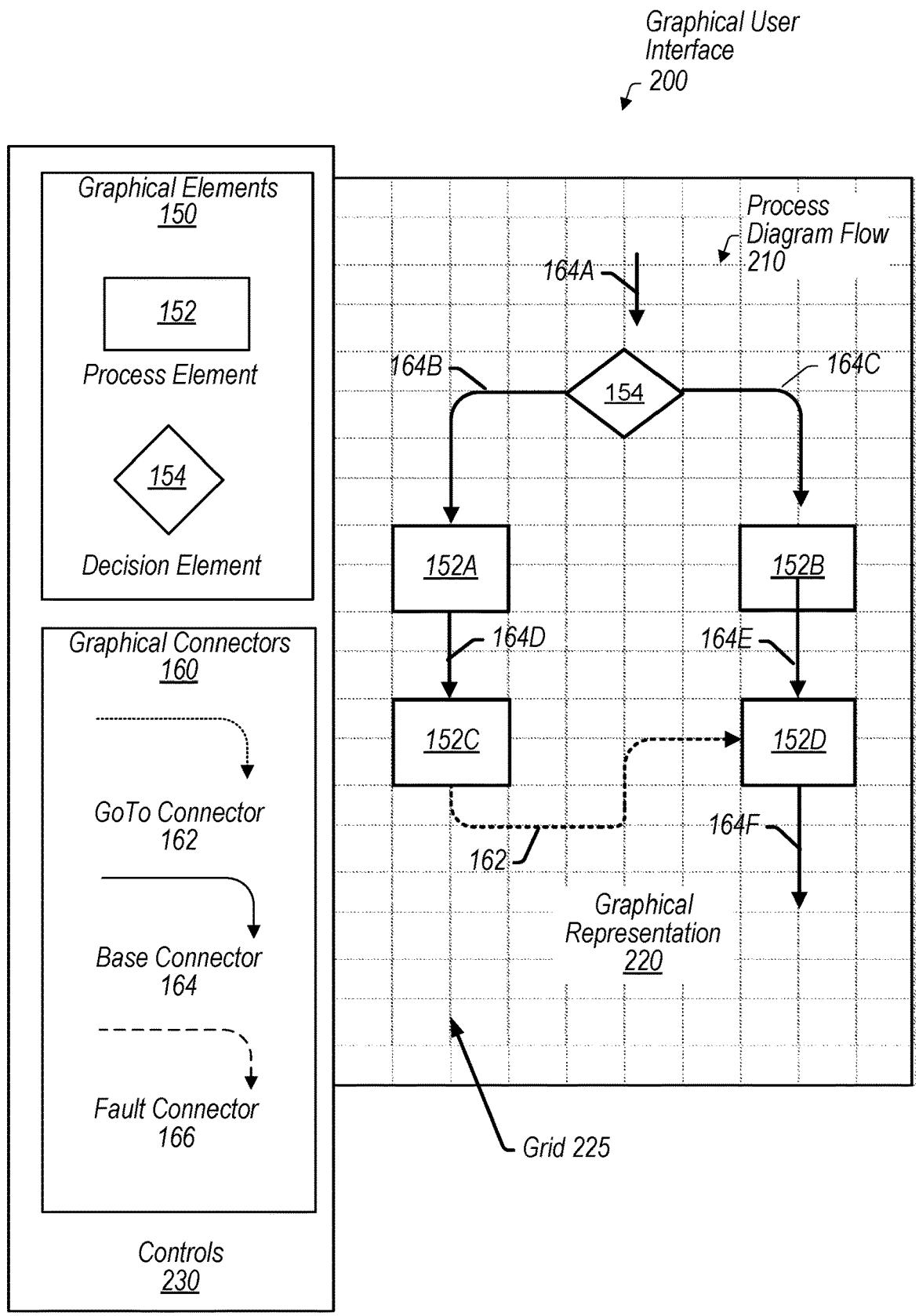
FIG. 2 depicts a block diagram of an example graphical user interface (GUI) for creating process diagram flows, according to some embodiments.

FIG. 2 depicts a block diagram of an example graphical user interface (GUI) 200 for creating process diagram flows 210, according to some embodiments. In the illustrated embodiment, GUI 200 includes graphical representation 220 of process diagram flow 210 and controls 230. As shown, controls 230 comprises controls for graphical elements 150 and graphical connectors 160. Controls for graphical elements 150 may include, for example, controls for process elements 152 and decision element 154. Controls for graphical connectors 160 may include, for example, controls for GoTo connector 162, base connector 164, and fault connector 166. In some embodiments, GUI 200 is implemented differently than shown. As an example, GUI 200 may include a legend for interpreting the meaning of different symbols shown within graphical representation 220.

Graphical representation 220, in various embodiments, shows a visual view of process diagram flow 210 that may enable a user to easily interpret and understand the process diagram flow. In some embodiments, certain visual aspects may be auto generated as opposed to being defined by a user. As an example, a user may identify connections between elements 150 but GUI 200 may render, in graphical representation 220, connectors 160 between the elements 150 based on layout policies. Layout policies may include, for example, sets of predetermined rules, as described herein. These layout policies may attempt to simplify the visual view of process diagram flow 210 and standardize the visual view across different process flows. For example, connectors 160 that flow into an element 150 may be depicted as connecting to the upper portion of the element while connectors 160 that flow from the element may be depicted as connecting to the lower portion of that element. As a result of the layout policies, the visual view of process diagram flow 210 may be less convoluted.

In various embodiments, graphical representation 220 is visually presented on grid 225 (e.g., process diagram flow 210 is overlayed on grid 225 in graphical representation 220). Grid 225 may be a visual representation of spacing implemented for the placement of elements 150 and connectors 160 in process diagram flow 210. For instance, grid 225 may be a visual representation of a grid implemented in process diagram flow 210 where the grid lines in grid 225 correspond to a specific number of pixels in the horizontal and vertical directions. Accordingly, numbers of pixels for placements of elements 150 or connectors 160 in the information describing process diagram flow 210 (e.g., process diagram information 120) may correspond to the visual representation of the grid lines in grid 225 overlayed on process diagram flow 210 in graphical representation 220.

In certain embodiments, as described above, process diagram flow 210 is being generated in an autolayout environment where predetermined rules limit placement of elements 150 and routing of connectors 160 in the process diagram flow. With grid 225 overlayed on process diagram flow 210, graphical representation 220 can provide a visualization of the positions and paths of elements 150 and connectors 160 being placed in process diagram flow 210. Thus, spacing or routing requirements from the predetermined rules for the autolayout environment may be visualized on graphical representation 220 using grid 225 overlaying process diagram flow 210.

In the illustrated embodiment, controls 230 include components that enable a user to build and configure process diagram flow 210 according to the predetermined rules for the autolayout environment. In various embodiments, controls 230 may include menus that enable a user to change the view of process diagram flow 210 that is presented in graphical representation 220. While not shown, controls 230 may also include a save option for saving process diagram flow 210 and a compile option for compiling the process diagram flow into an executable.

In certain embodiments, controls 230 are implemented directly within graphical representation 220 (e.g., not in a menu separate from the graphical representation). For instance, in some embodiments, control interfaces within graphical representation 220 enable a user to cause an element interface to be presented for graphical element 150 so that the user can configure the element (e.g., by providing user input into fields defined for the element). In some embodiments, graphical representation 220 includes user-selectable elements for adding or configuring elements or connectors in process diagram flow 210.

Figure 3:
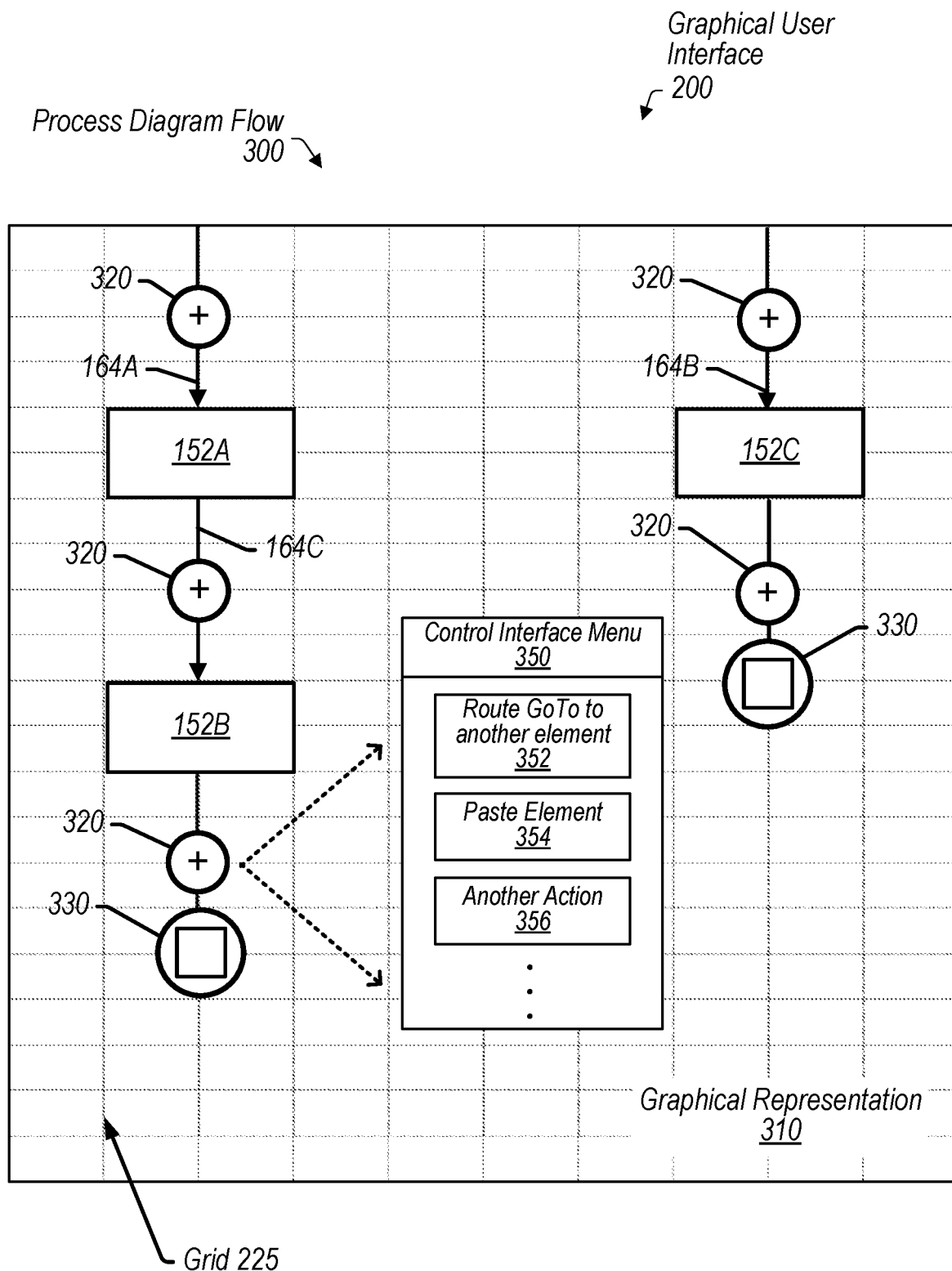
FIG. 3 depicts a block diagram of an example portion of a process diagram flow being generated within a GUI, according to some embodiments.

FIG. 3 depicts a block diagram of an example portion of a process diagram flow 300 being generated within GUI 200, according to some embodiments. In the illustrated embodiment, graphical representation 310 includes two branches with process elements 152A and 152B in a first branch (e.g., the left branch) and process element 152C in a second branch (e.g., the right branch). Graphical representation 310 further includes selectable control interfaces 320 and stop markers 330. Selectable control interfaces 320 are user-selectable elements for bringing up control interface menu 350, described in more detail below. Stop markers 330 are placed after the last elements placed in a flow branch by the user (e.g., after process element 152B and process element 152C in the illustrated embodiment).

In certain embodiments, selection of a selectable control interface 320 by a user brings up control interface menu 350 in graphical representation 310 in GUI 200. Control interface menu 350 may include a menu of available actions based on the position of selectable control interface 320 in process diagram flow 300. For example, control interface menu 350 may include options for adding a GoTo connector ("Route GoTo to another element 352"), pasting a graphical element ("Paste Element 354"), or other actions ("Another Action 356"). Other actions may also be included in control interface menu 350. In various embodiments, the actions displayed in control interface menu 350 are determined by predetermined rules (e.g., layout policies) of the autolayout environment based on the location of selectable control interface 320 in process diagram flow 300. For instance, if a GoTo connector cannot be routed from the location of selectable control interface 320 in process diagram flow 300 based on, then "Route GoTo to another element 352" may not be displayed in control interface menu 350.

In various embodiments, graphical elements 150 are added to process diagram flow 300 by selecting "Paste Element 354" in control interface menu 350. In some embodiments, an additional interface menu or a submenu may then be provided to the user in GUI 200 to allow the selection of the type of element to place in process diagram flow 300. For example, the user may be able to select from either process element 152 or decision element 154 to add to process diagram 300. Additional actions may also be available after selection of the type of element such as, but not limited, defining the process or the decision to be made or labeling the element.

In the autolayout environment of GUI 200, the locations for placement of graphical elements 150 are predetermined according to the rules of the autolayout environment. For instance, process element 152B is placed a predetermined distance from process element 152A after the user selects the placement of process element 152B in process diagram flow 300. Thus, graphical elements 150 are placed only in locations allowed by the predetermined rules (such as spacing or placement rules) of the autolayout environment. Placing graphical elements 150 according to the predetermined rules of the autolayout environment maintains spacing and other positional requirements as a user adds graphical elements to process diagram flow 300. Accordingly, correct spacing between graphical elements 150 in process diagram flow 300 is maintained and the visualization of the process diagram flow in graphical representation 310 is less convoluted and remains understandable for the user.

In some embodiments, various graphical connectors 160 are automatically added to process diagram flow 300 when graphical elements 150 are added to the process diagram flow. For example, base connectors 164 (such as base connectors 164A, 164B, 164C in FIG. 3) may be automatically added when process elements 152A, 152B, 152C are added to process diagram flow 300. The addition of base connectors 164 may be determined based on the type of graphical element 150 being added to process diagram flow 300. For instance, as shown in FIG. 3, base connector 164C has been added between process element 152A and process element 152B due to both elements being process elements. Conversely, if a fault element is added to process diagram flow 300, a fault connector (e.g., fault connector 166) may be added to the process diagram flow to connect to the fault element.

In certain embodiments, the addition of GoTo connector 166 to process diagram flow 300 from a graphical element is made by a user selecting "Route GoTo to another element 352" (or a similar designation) in control interface menu 350. For example, in the illustrated embodiment, the user has brought up control interface menu 350 by selecting the selectable control interface 320 after (below) process element 152B. The user may then select to add a GoTo connector outputting from process element 152B by selecting "Route GoTo to another element 352" in control interface menu 350. The user may then be prompted to select the graphical element to which the GoTo connector will route. In various embodiments, graphical elements available for the GoTo connector may be determined by the predetermined rules of the autolayout environment. Accordingly, only the graphical elements determined to be available for the GoTo connector may be allowed to be selected by the user.

Figure 4:
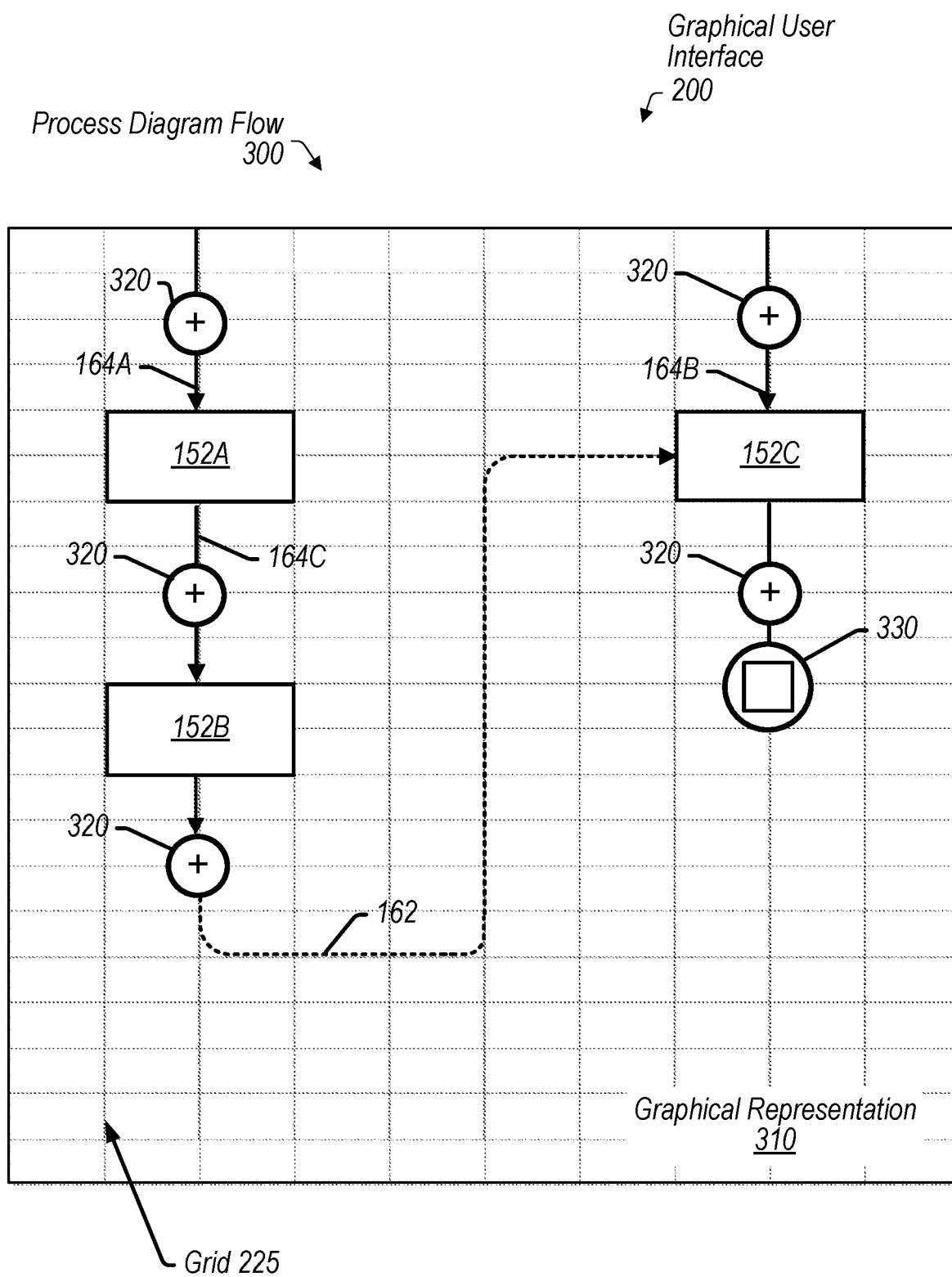
FIG. 4 depicts a block diagram of an example of a GoTo connector added to a process diagram flow, according to some embodiments.

FIG. 4 depicts a block diagram of an example of a GoTo connector 162 added to process diagram flow 300, according to some embodiments. In the illustrated embodiment, GoTo connector 162 has been added between process element 152B and process element 152C. In certain embodiments, the path of GoTo connector 162 has been determined according to the predetermined rules for autolayout environment (e.g., a predetermined set of connection rules for the autolayout environment).

Example Connection Rules for GoTo Connectors

In certain embodiments, a predetermined connection rule for a GoTo connector in the autolayout environment is that the GoTo connectors are only allowed to leave (e.g., output) from one side of graphical elements in a process diagram flow. For instance, in a typical vertically progressing (top to bottom) process diagram flow (as shown in FIG. 4), GoTo connectors may only be allowed to leave from the bottom side of graphical elements in the process diagram flow. Thus, GoTo connector 162 must leave from the selectable control interface 320 after (below) process element 152B. Similarly, in some embodiments, a predetermined connection rule for a GoTo connector includes that the GoTo connector must enter (e.g., input) a graphical connector on only one side of graphical elements in the process diagram flow. For instance, in the vertically progressing process diagram flow, such as shown in FIG. 4, GoTo connector 162 enters on the left side of process element 152C. Limiting the sides that GoTo connectors leave/enter graphical elements maintains the clarity in visual presentation of GoTo connectors in the process diagram flow.

In various embodiments, a predetermined connection rule for a GoTo connector in the autolayout environment provides that only GoTo connector may be allowed to leave (e.g., output) from a single graphical element. For instance, in the illustrated embodiment of FIG. 4, only GoTo connector 162 is allowed to leave from process element 152B. Thus, when a user selects the selectable control interface 320 after (below) process element 152B, adding another GoTo connector will not be presented as an option (though the user may be presented with the option to remove the existing GoTo connector). In some embodiments, a predetermined connection rule for a GoTo connector includes that once a GoTo connector is added to a graphical element, no additional downstream connections may be allowed from the graphical element. Accordingly, in the example of FIG. 4, no additional downstream elements would be allowed from process element 152B after GoTo connector 162 is placed in process diagram flow 300.

In some embodiments, a predetermined connection rule for a GoTo connector is that the GoTo connector must go to a graphical element upstream from the graphical element the GoTo connector is leaving. For example, in FIG. 4, GoTo connector 162 is allowed to go from process element 152B to process element 152C as process element 152C is upstream from process element 152B. GoTo connector 162 would also be allowed to go to process element 152A from process element 152B. Conversely, GoTo connector 162 would not be allowed to go from process element 152C (or process element 152A) to process element 152B. In some embodiments, determination of whether a graphical element is upstream or downstream of another graphical element may be based on the grid on which the process diagram flow is laid out (e.g., grid 225 in process diagram flow 300). For instance, in the vertical process diagram flow, a GoTo connector must go to a graphical element that is higher vertically in the grid than the graphical element the GoTo connector is leaving.

In certain embodiments, predetermined connection rules for GoTo connectors include rules about a path a GoTo connector can take and what is allowed along the path. For instance, in some embodiments, a predetermined connection rule for a GoTo connector is that no additional graphical elements can be added along a path of a GoTo connector. Thus, GoTo connectors are only allowed to go from one graphical element to another graphical element without any additional processing or other functions added to the GoTo connector path.

In certain embodiments, a predetermined connection rule for a GoTo connector is that a path of a GoTo connector must not cross any graphical elements in the process diagram flow. For instance, the GoTo connector path may respect the spacing (e.g., boundary) requirements around graphical elements in the process diagram flow. GoTo connectors may, however, be allowed to cross other connectors (e.g., other GoTo connectors or base connectors). In various embodiments, in order to respect the spacing, GoTo connectors may follow grid lines in the process diagram. For example, in the illustrated embodiment of FIG. 4, GoTo connector 162 respects the spacing of process elements 152A, 152B, 152C by following the grid lines between the elements. Grid lines may also be implemented to maintain the spacing requirements from graphical elements (e.g., maintain a minimum number of grid lines between a GoTo connector and a graphical element.

While GoTo connectors may be limited to leaving (e.g., outputting) from a single graphical element, such restrictions may not be placed on GoTo connectors entering (e.g., inputting) to graphical elements. Thus, a single graphical element may have more than one GoTo connector entering the graphical element. In such embodiments, having the GoTo connectors each depicted individually may clutter the space in a process diagram flow or create confusion in understanding the process diagram flow. To alleviate this issue, in some embodiments, predetermined connection rules for GoTo connectors include rules that combine portions of the paths of GoTo connectors when the GoTo connectors traverse similar paths.

Figure 5:
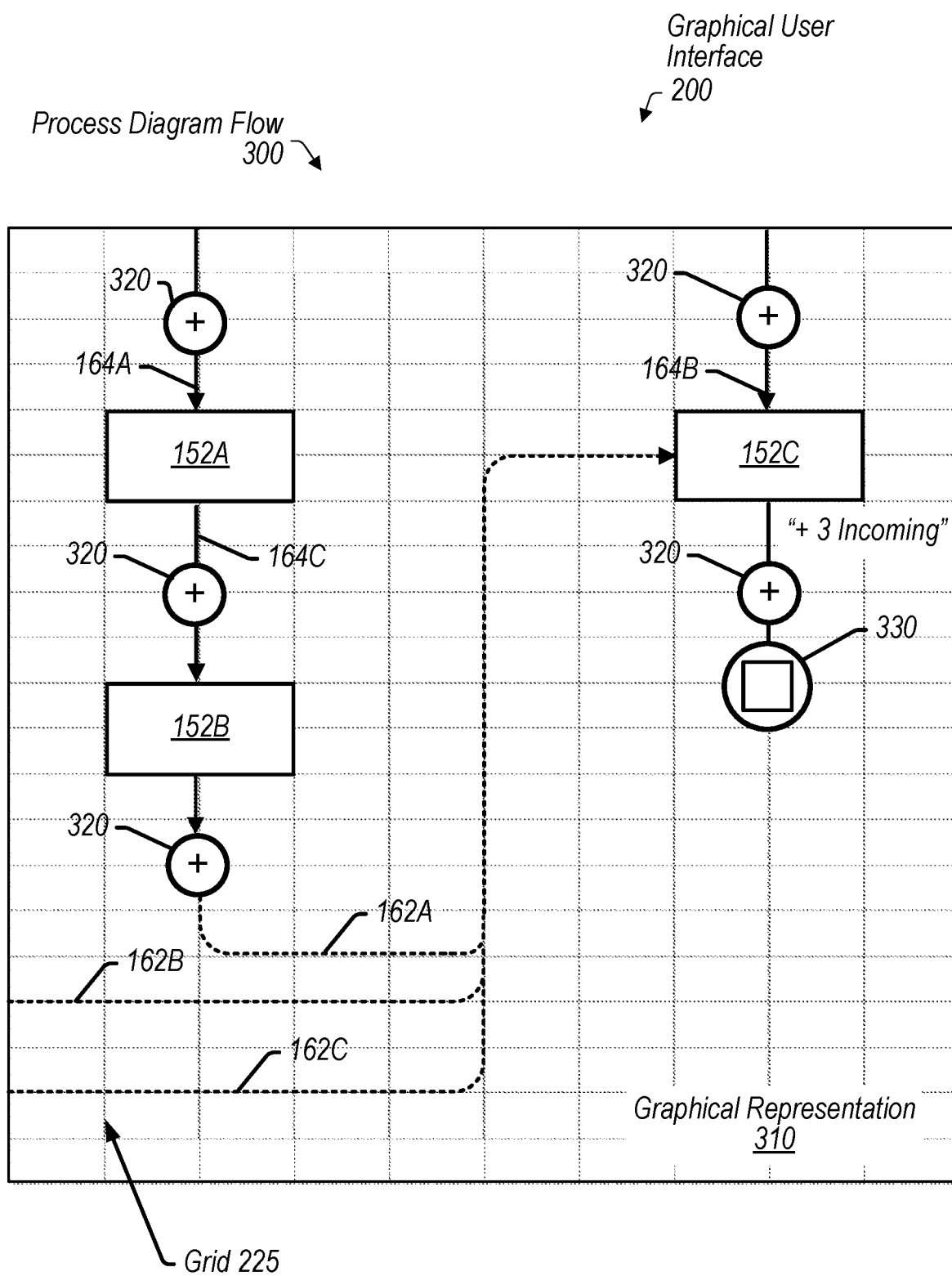
FIG. 5 depicts a block diagram of an example of three GoTo connectors entering a process element in a process diagram flow, according to some embodiments.

FIG. 5 depicts a block diagram of an example of three GoTo connectors 162 entering process element 152C in process diagram flow 300, according to some embodiments. As shown in FIG. 5, GoTo connectors 162A, 162B, and 162C originate from different areas of process diagram flow 300 but then have essentially the same path vertically and before entering process element 152C. Thus, to simplify process diagram flow 300, the overlapping paths of GoTo connectors 162A, 162B, and 162C may be combined into a single path. In some embodiments, a clarifier (e.g., additional text) may be added to process element 152C to identify that three GoTo connectors enter the process element. For example, in the illustrated embodiment, "+3 Incoming" may be added to a text element descriptor of process element 152C.

Figure 6:
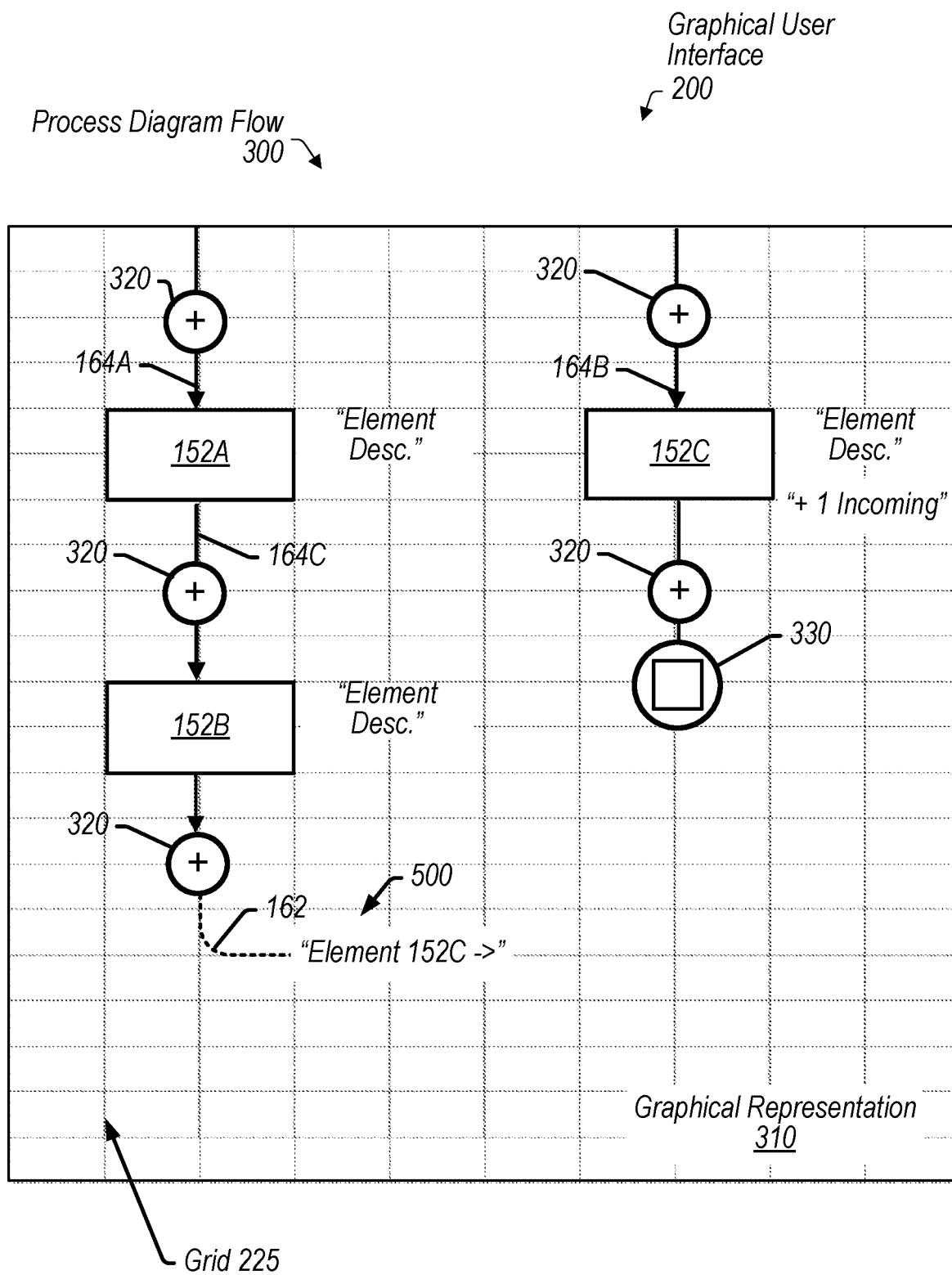
FIG. 6 depicts a block diagram of an example of a collapsed GoTo connector in a process diagram flow, according to some embodiments.

In various embodiments, a user may be allowed to collapse or expand GoTo connectors, or multiple GoTo connectors, in process diagram flow 300. Collapsing of a GoTo connector may "stub" the GoTo connector as it exits or enters graphical elements to free up space within process diagram flow. FIG. 6 depicts a block diagram of an example of a collapsed GoTo connector 162 in process diagram flow 300, according to some embodiments. In the illustrated embodiment, GoTo connector 162, from the embodiment of FIG. 4, is collapsed and results in stub 500 below process element 152B. Stub 500 may include an identifier of where GoTo connector 162 goes in process diagram flow 300. For example, stub 500 may include "Element 152C" to identify that GoTo connector 162 goes to process element 152C. Additionally, process element 152C may include a clarifier that a GoTo connector enters the process element (similar to the identifier from FIG. 5). In this instance, the clarifier may state "+1 Incoming", as shown in FIG. 6.

In some embodiments, the collapsing or expanding of one or more GoTo connectors 162 may be implemented through user selection of selectable control interface 320 and control interface menu 350 (as shown in FIG. 3). For example, control interface menu 350 may include a checkbox or other user interface element to toggle the visibility of GoTo connectors 162 in process diagram flow 300 between a collapsed (e.g., "stubbed") or expanded state. Additional embodiments may be contemplated where collapsing or expanding is controlled by direct interaction with the GoTo connectors in collapsed or expanded states. For instance, the user may be allowed to hover or focus over GoTo connectors to collapse or expand the GoTo connectors.

Figure 7:
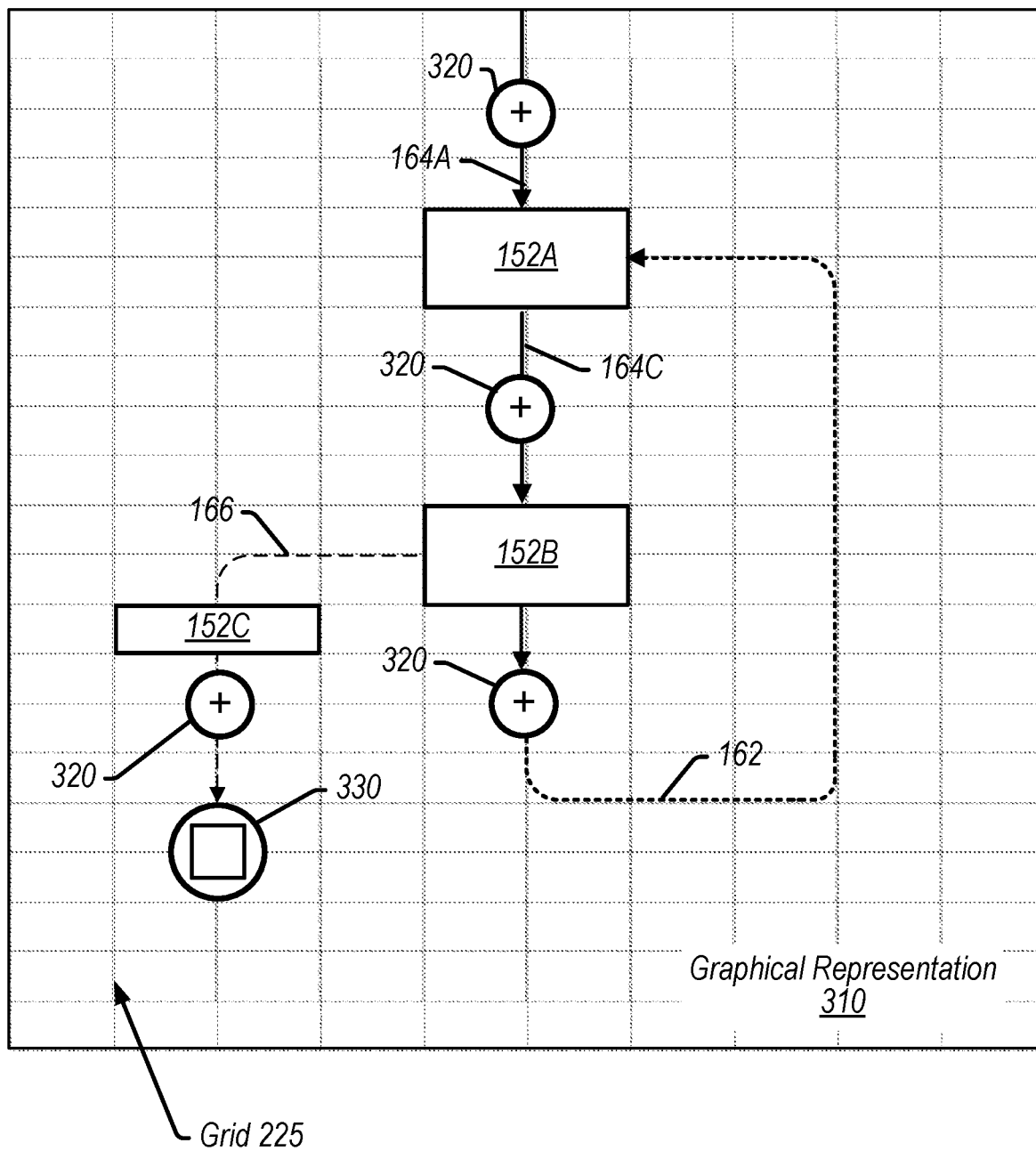
FIG. 7 depicts a block diagram of an example of a CRUD graphical element with a GoTo connector and a fault connector in a process diagram flow, according to some embodiments.

As described above, in certain embodiments, the predetermined connection rules for GoTo connectors provide that only a GoTo connector may exit a graphical connector. Some embodiments of graphical elements may, however, be allowed to have additional routing in addition to a GoTo connector. For example, a CRUD (Create-Read-Update-Delete) graphical element or similar data operation element may include a fault connection in addition to a GoTo connector. FIG. 7 depicts a block diagram of an example of a CRUD graphical element with GoTo connector 162 and fault connector 166 in process diagram flow 300, according to some embodiments. In the illustrated embodiment, GoTo connector 162 exits process element 152B and goes back to process element 152A. Process element 152C is a fault element connected to process element 152B by fault connector 166. Process element 152C is then followed by selectable control interface 320 and stop marker 330. Both GoTo connector 162 and fault connector 166 are allowed from process element 152B because of the fault finish in process element 152C.

Example Methods

Figure 8:
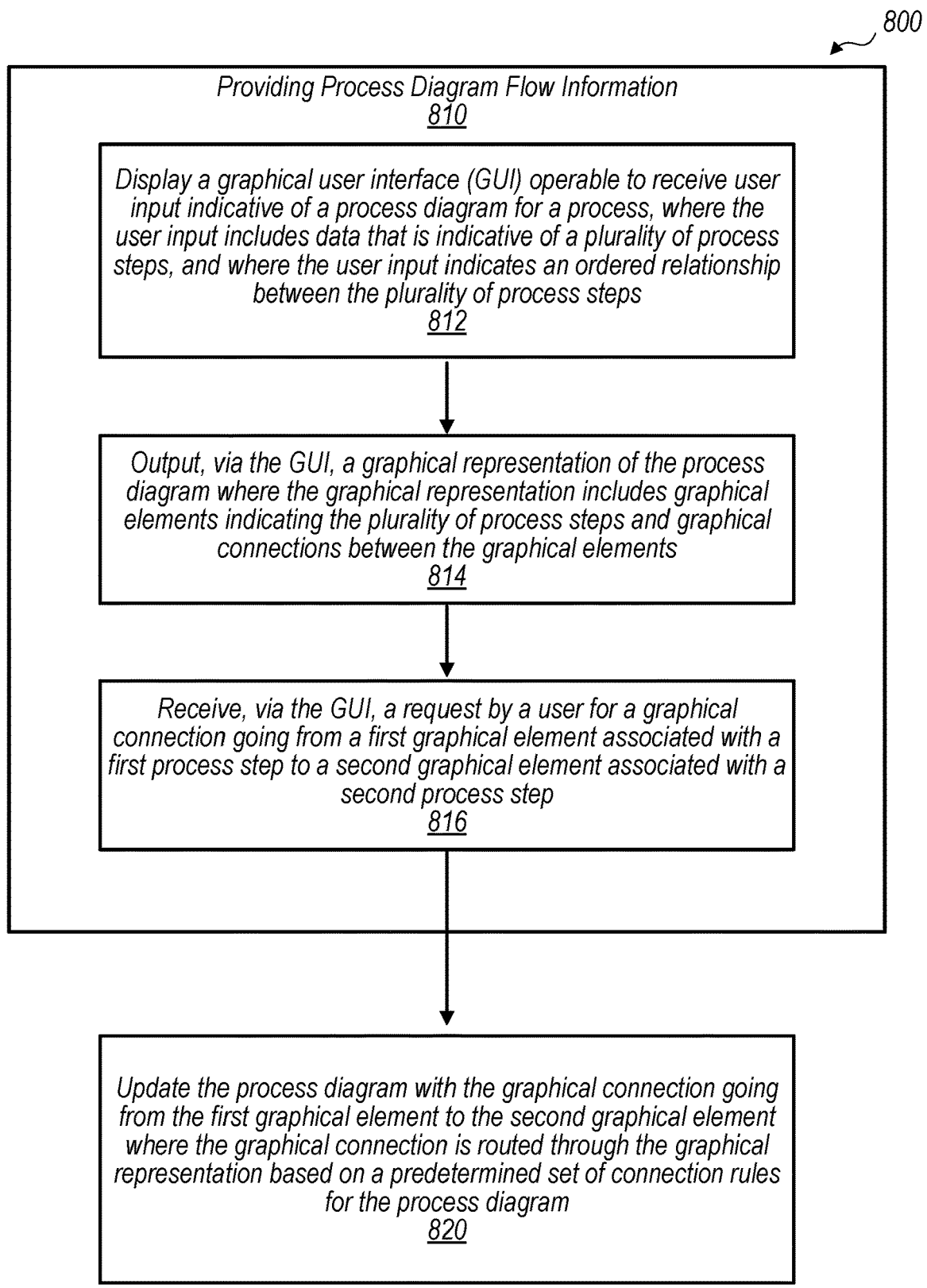
FIG. 8 depicts a flow diagram of a method, according to some embodiments.

FIG. 8 depicts a flow diagram of a method, according to some embodiments. Method 800 is one embodiment of a method performed by a computer system (e.g., platform 110) to execute a process flow (e.g., a process diagram flow 300) that includes a GoTo connector (e.g., GoTo connector 162). Method 800 may be performed by executing program instructions stored on a non-transitory computer-readable medium. Method 800 may be performed in response to the occurrence of an event, such as a user issuing a request to the computer system to execute the process flow. In some embodiments, method 800 includes more or less steps than shown. For example, method 800 may include a step in which the process flow is stored at the computer system.

Method 800 begins in step 810 with a computer system providing process diagram flow information to a client computer system. In various embodiments, the process diagram flow information includes various steps involved with presenting and receiving information about the process diagram flow on the client computer system. In step 812, the process diagram flow information includes information for the client computer system to display a graphical user interface (GUI) operable to receive user input indicative of a process diagram for a process, where the user input includes data that is indicative of a plurality of process steps, and where the user input indicates an ordered relationship between the plurality of process steps. In step 814, the process diagram flow information includes information for the client computer system to output, via the GUI, a graphical representation of the process diagram where the graphical representation includes graphical elements indicating the plurality of process steps and graphical connections between the graphical elements. In step 816, the process diagram flow information includes information for the client computer system to receive, via the GUI, a request by a user for a graphical connection going from a first graphical element associated with a first process step to a second graphical element associated with a second process step.

In various embodiments, after receiving the request for the graphical connection from the client computer system, the computer system updates the process diagram with the graphical connection going from the first graphical element to the second graphical element where the graphical connection is routed through the graphical representation based on a predetermined set of connection rules for the process diagram. In some embodiments, the first graphical element is downstream of the second graphical element in the graphical representation of the process diagram. In some embodiments, the information that is executable by the client computer system includes information to transmit, to the computer system by the client computer system, the request by the user for the graphical connection going from the first graphical element associated with the first process step to the second graphical element associated with the second process step received via the GUI on the client computer system.

In some embodiments, at least one of the connection rules in the predetermined set includes a rule that the second process step occurs before the first process step in the process. In some embodiments, at least one of the connection rules in the predetermined set includes a rule that the graphical connection is limited to connecting the second process step to the first process step in the process. In some embodiments, at least one of the connection rules in the predetermined set includes a rule that no additional graphical connections can be added to the first process step.

Exemplary Multi-Tenant Database System

Figure 9:
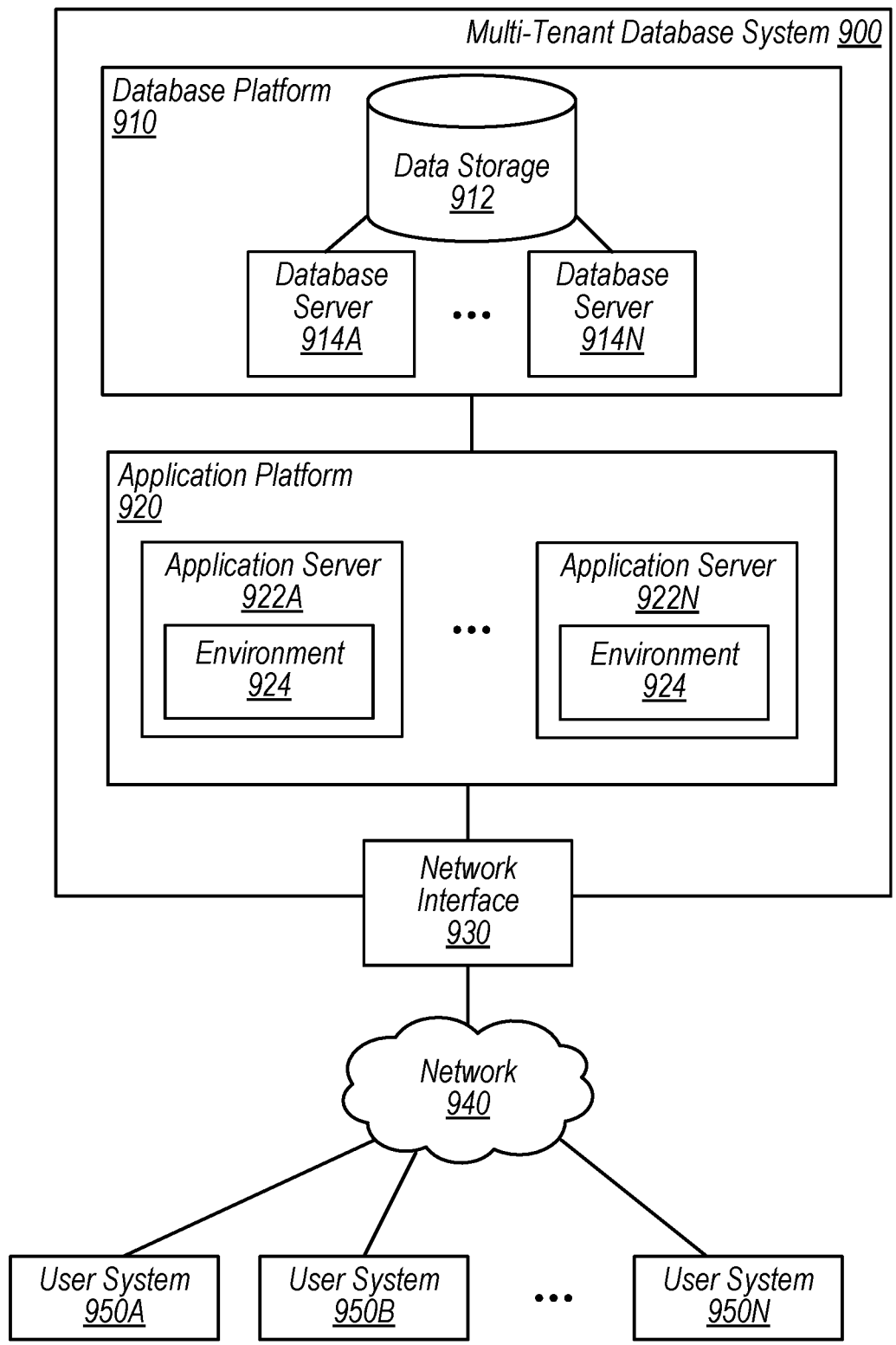
FIG. 9 is a block diagram illustrating elements of a multi-tenant system, according to some embodiments.

Turning now to FIG. 9, an exemplary multi-tenant database system (MTS) 900 in which various techniques of the present disclosure can be implemented is shown—e.g., system 100 may be MTS 900. In FIG. 9, MTS 900 includes a database platform 910, an application platform 920, and a network interface 930 connected to a network 940. Also as shown, database platform 910 includes a data storage 912 and a set of database servers 914A-N that interact with data storage 912, and application platform 920 includes a set of application servers 922A-N having respective environments 924. In the illustrated embodiment, MTS 900 is connected to various user systems 950A-N through network 940. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 900, in various embodiments, is a set of computer systems that together provide various services to users (alternatively referred to as "tenants") that interact with MTS 900. In some embodiments, MTS 900 implements a customer relationship management (CRM) system that provides mechanism for tenants (e.g., companies, government bodies, etc.) to manage their relationships and interactions with customers and potential customers. For example, MTS 900 might enable tenants to store customer contact information (e.g., a customer's website, email address, telephone number, and social media), identify opportunities, record service issues, and manage campaigns. Moreover, MTS 900 may enable those tenants to identify how customers have been communicated with, what the customers have bought, when the customers last purchased items, and what the customers paid. To provide the services of a CRM system and/or other services, as shown, MTS 900 includes a database platform 910 and an application platform 920.

Database platform 910, in various embodiments, is a combination of hardware elements and software routines that implement database services for storing and managing data of MTS 900, including tenant data. As shown, database platform 910 includes data storage 912. Data storage 912, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 912 is used to implement a database comprising a collection of information that is organized in a way that allows for access, storage, and manipulation of the information. Data storage 912 may implement a single database, a distributed database, a collection of distributed databases, a database with redundant online or offline backups or other redundancies, etc. As part of implementing the database, data storage 912 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 900 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 912 is organized as part of a log-structured merge-tree (LSM tree). An LSM tree normally includes two high-level components: an in-memory buffer and a persistent storage. In operation, a database server 914 may initially write database records into a local in-memory buffer before later flushing those records to the persistent storage (e.g., data storage 912). As part of flushing database records, the database server 914 may write the database records into new files that are included in a "top" level of the LSM tree. Over time, the database records may be rewritten by database servers 914 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 912.

When a database server 914 wishes to access a database record for a particular key, the database server 914 may traverse the different levels of the LSM tree for files that potentially include a database record for that particular key. If the database server 914 determines that a file may include a relevant database record, the database server 914 may fetch the file from data storage 912 into a memory of the database server 914. The database server 914 may then check the fetched file for a database record having the particular key. In various embodiments, database records are immutable once written to data storage 912. Accordingly, if the database server 914 wishes to modify the value of a row of a table (which may be identified from the accessed database record), the database server 914 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 914, in various embodiments, are hardware elements, software routines, or a combination thereof capable of providing database services, such as data storage, data retrieval, and/or data manipulation. Such database services may be provided by database servers 914 to components (e.g., application servers 922) within MTS 900 and to components external to MTS 900. As an example, a database server 914 may receive a database transaction request from an application server 922 that is requesting data to be written to or read from data storage 912. The database transaction request may specify an SQL SELECT command to select one or more rows from one or more database tables. The contents of a row may be defined in a database record and thus database server 914 may locate and return one or more database records that correspond to the selected one or more table rows. In various cases, the database transaction request may instruct database server 914 to write one or more database records for the LSM tree—database servers 914 maintain the LSM tree implemented on database platform 910. In some embodiments, database servers 914 implement a relational database management system (RDMS) or object oriented database management system (OODBMS) that facilitates storage and retrieval of information against data storage 912. In various cases, database servers 914 may communicate with each other to facilitate the processing of transactions. For example, database server 914A may communicate with database server 914N to determine if database server 914N has written a database record into its in-memory buffer for a particular key.

Application platform 920, in various embodiments, is a combination of hardware elements and software routines that implement and execute CRM software applications as well as provide related data, code, forms, web pages and other information to and from user systems 950 and store related data, objects, web page content, and other tenant information via database platform 910. In order to facilitate these services, in various embodiments, application platform 920 communicates with database platform 910 to store, access, and manipulate data. In some instances, application platform 920 may communicate with database platform 910 via different network connections. For example, one application server 922 may be coupled via a local area network and another application server 922 may be coupled via a direct network link. Transfer Control Protocol and Internet Protocol (TCP/IP) are exemplary protocols for communicating between application platform 920 and database platform 910, however, it will be apparent to those skilled in the art that other transport protocols may be used depending on the network interconnect used.

Application servers 922, in various embodiments, are hardware elements, software routines, or a combination thereof capable of providing services of application platform 920, including processing requests received from tenants of MTS 900. Application servers 922, in various embodiments, can spawn environments 924 that are usable for various purposes, such as providing functionality for developers to develop, execute, and manage applications. Data may be transferred into an environment 924 from another environment 924 and/or from database platform 910. In some cases, environments 924 cannot access data from other environments 924 unless such data is expressly shared. In some embodiments, multiple environments 924 can be associated with a single tenant.

Application platform 920 may provide user systems 950 access to multiple, different hosted (standard and/or custom) applications, including a CRM application and/or applications developed by tenants. In various embodiments, application platform 920 may manage creation of the applications, testing of the applications, storage of the applications into database objects at data storage 912, execution of the applications in an environment 924 (e.g., a virtual machine of a process space), or any combination thereof. In some embodiments, application platform 920 may add and remove application servers 922 from a server pool at any time for any reason, there may be no server affinity for a user and/or organization to a specific application server 922. In some embodiments, an interface system (not shown) implementing a load balancing function (e.g., an F5 Big-IP load balancer) is located between the application servers 922 and the user systems 950 and is configured to distribute requests to the application servers 922. In some embodiments, the load balancer uses a least connections algorithm to route user requests to the application servers 922. Other examples of load balancing algorithms, such as are round robin and observed response time, also can be used. For example, in certain embodiments, three consecutive requests from the same user could hit three different servers 922, and three requests from different users could hit the same server 922.

In some embodiments, MTS 900 provides security mechanisms, such as encryption, to keep each tenant's data separate unless the data is shared. If more than one server 914 or 922 is used, they may be located in close proximity to one another (e.g., in a server farm located in a single building or campus), or they may be distributed at locations remote from one another (e.g., one or more servers 914 located in city A and one or more servers 922 located in city B). Accordingly, MTS 900 may include one or more logically and/or physically connected servers distributed locally or across one or more geographic locations.

One or more users (e.g., via user systems 950) may interact with MTS 900 via network 940. User system 950 may correspond to, for example, a tenant of MTS 900, a provider (e.g., an administrator) of MTS 900, or a third party. Each user system 950 may be a desktop personal computer, workstation, laptop, PDA, cell phone, or any Wireless Access Protocol (WAP) enabled device or any other computing device capable of interfacing directly or indirectly to the Internet or other network connection. User system 950 may include dedicated hardware configured to interface with MTS 900 over network 940. User system 950 may execute a graphical user interface (GUI) corresponding to MTS 900, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 950 to access, process, and view information and pages available to it from MTS 900 over network 940. Each user system 950 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 900 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 950 may be users in differing capacities, the capacity of a particular user system 950 might be determined one or more permission levels associated with the current user. For example, when a user is using a particular user system 950 to interact with MTS 900, that user system 950 may have capacities (e.g., user privileges) allotted to that user. But when an administrator is using the same user system 950 to interact with MTS 900, the user system 950 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 900 that are allocated at the tenant level while other data structures are managed at the user level.

In some embodiments, a user system 950 and its components are configurable using applications, such as a browser, that include computer code executable on one or more processing elements. Similarly, in some embodiments, MTS 900 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 940 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 950 may communicate with MTS 900 using TCP/IP and, at a higher network level, use other common Internet protocols to communicate, such as HTTP, FTP, AFS, WAP, etc. For example, where HTTP is used, user system 950 might include an HTTP client commonly referred to as a "browser" for sending and receiving HTTP messages from an HTTP server at MTS 900. Such a server might be implemented as the sole network interface between MTS 900 and network 940, but other techniques might be used as well or instead. In some implementations, the interface between MTS 900 and network 940 includes load sharing functionality, such as round-robin HTTP request distributors to balance loads and distribute incoming HTTP requests evenly over a plurality of servers.

In various embodiments, user systems 950 communicate with application servers 922 to request and update system-level and tenant-level data from MTS 900 that may require one or more queries to data storage 912. In some embodiments, MTS 900 automatically generates one or more SQL statements (the SQL query) designed to access the desired information. In some cases, user systems 950 may generate requests having a specific format corresponding to at least a portion of MTS 900. As an example, user systems 950 may request to move data objects into a particular environment 924 using an object notation that describes an object relationship mapping (e.g., a JavaScript object notation mapping) of the specified plurality of objects.

Exemplary Computer System

Figure 10:
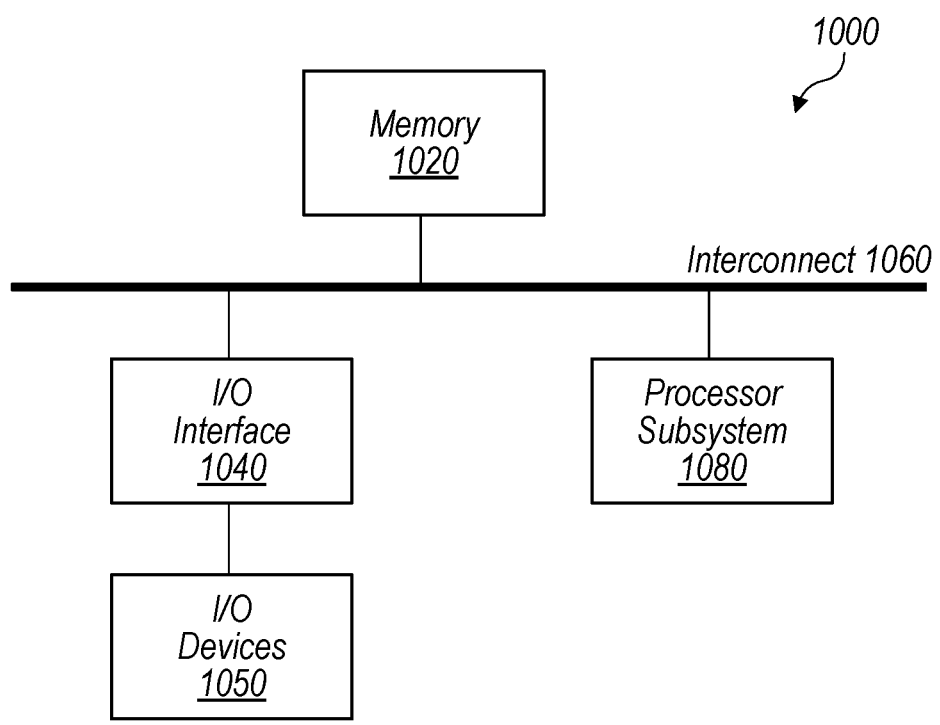
FIG. 10 is a block diagram illustrating elements of a computer system for implementing various systems described in the present disclosure, according to some embodiments.

Turning now to FIG. 10, a block diagram of an exemplary computer system 1000, which may implement system 100, platform 110, user device 170, MTS 900, and/or user system 950, is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080. In various embodiments, program instructions for implementing process diagram engine 130 and GUI 200 may be included/stored within system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:
1. A method, comprising:
providing, by a computer system, information for implementation of an autolayout environment for generating a process diagram, the information being executable by a client computer system to:
render a graphical user interface (GUI) associated with the autolayout environment on a display of the client computer system, wherein the GUI is operable to receive user input indicative of a plurality of process steps and an ordered relationship between the process steps in the process diagram;
output, via the GUI, a graphical representation for display of the process diagram, the graphical representation including graphical elements indicating the plurality of process steps and graphical connections between the graphical elements;
receive, via the GUI, a selection by a user to implement a direct graphical connection going from a first graphical element associated with a first process step;
enable, for selection by the user on the GUI, one or more graphical elements available for the direct graphical connection, wherein the available graphical elements are determined according to a set of rules for direct graphical connections between the graphical elements, at least one of the rules being that the process step associated with the available graphical element occurs before the first process step;
receive, via the GUI, a selection by the user of one of the available graphical elements as a second graphical element associated with a second process step;
update the graphical representation of the process diagram with a route for the direct graphical connection from the first graphical element to the second graphical element, wherein the route is determined according to the set of rules; and generate process diagram information that includes computer-executable instructions for executing the process diagram according to the graphical representation.

2. The method of claim 1, wherein at least one of the rules for direct graphical connections between graphical elements includes a rule that the graphical connection is limited to connecting the second process step to the first process step.

3. The method of claim 1, wherein at least one of the rules for direct graphical connections between graphical elements includes a rule that no additional graphical connections can be added to the first process step.

4. The method of claim 1, wherein at least one of the rules for direct graphical connections between graphical elements includes a rule that the graphical connection cannot include any additional graphical elements.

5. The method of claim 1, wherein the graphical representation of the process diagram has a structured spatial separation between graphical elements.

6. The method of claim 1, wherein the information is executable by the client computer system to:
receive, via the GUI, a second selection by a user to implement a second direct graphical connection going from a third graphical element associated with a third process step to the second graphical element; and
update the graphical representation of the process diagram with a second route for the second direct graphical connection from the third graphical element to the second graphical element.

7. The method of claim 6, further comprising collapsing overlapping portions of the direct graphical connection and the second direct graphical connection into a single direct graphical connection displayed in the process diagram.

8. The method of claim 7, further comprising providing a user-selectable element to expand the single direct graphical connection into the overlapping portions of the direct graphical connection and the second direct graphical connection.

9. The method of claim 7, further comprising displaying, on the process diagram, a descriptor of the direct graphical connection and the second direct graphical connection in association with the single direct graphical connection.

10. A non-transitory computer readable medium having program instructions stored thereon that are executable by a computer system to cause the computer system to perform operations comprising:
transmit instructions for implementation of an autolayout environment for generating a process diagram that are executable by a client computer system to:
render a graphical user interface (GUI) associated with the autolayout environment on a display of the client computer system, wherein the GUI is operable to receive user input indicative of a plurality of process steps and an ordered relationship between the process steps in the process diagram;
output, via the GUI, a graphical representation for display of the process diagram, wherein the graphical representation includes graphical elements indicating the of process steps and graphical connections between the graphical elements;
receive, via the GUI, a selection by a user to implement a direct graphical connection going from a first graphical element associated with a first process step;
enable, for selection by the user on the GUI, one or more graphical elements available for the direct graphical connection, wherein the available graphical elements are determined according to a set of rules for direct graphical connections between the graphical elements, at least one of the rules being that the process step associated with the available graphical element occurs before the first process step;
receive, via the GUI, a selection by the user of one of the available graphical elements as a second graphical element associated with a second process step;
update the graphical representation of the process diagram with a route for the direct graphical connection from the first graphical element to the second graphical element, wherein the route is determined according to the set of rules; and
generate process diagram information that includes computer-executable instructions for executing the process diagram according to the graphical representation.

11. The medium of claim 10, wherein the GUI includes a set of elements selectable by the user to build the process diagram, and wherein the instructions executable by the client computer system include a rule that inhibits the user from selecting graphical elements invalid for the direct graphical connection as the first graphical element.

12. A system, comprising:
at least one processor; and
memory having program instructions stored thereon that are executable by the at least one processor to cause the system to perform operations comprising:
providing information for implementation of an autolayout environment for generating a process diagram, the information being executable by a client computer system to:
render a graphical user interface (GUI) associated with the autolayout environment on a display of the client computer system, wherein the GUI is operable to receive user input indicative of a plurality of process steps and wherein the user input indicates an ordered relationship between the plurality of process steps in the process diagram;
output, via the GUI, a graphical representation for display of the process diagram, wherein the graphical representation includes graphical elements indicating the process steps and graphical connections between the graphical elements;
receive, via the GUI, a selection by a user to implement a direct graphical connection going from a first graphical element associated with a first process step to a second graphical element associated with a second process step;
enable, for selection by the user on the GUI, one or more graphical elements available as the second graphical element, wherein the available graphical elements are determined according to a set of rules for direct graphical connections between the graphical elements, at least one of the rules being that the process step associated with the available graphical element occurs before the first process step;
receive, via the GUI, a selection by the user of one of the available graphical elements as the second graphical element associated with the second process step;
update the graphical representation of the process diagram with a route for the direct graphical connection from the first graphical element to the second graphical element, wherein the route is determined according to the set of rules; and generate process diagram information that includes computer-executable instructions for executing the process diagram according to the graphical representation.

13. The system of claim 12, further comprising providing information that is executable by the client computer system to:

receive, via the GUI, a second selection by the user for a second direct graphical connection going from a third graphical element associated with a third process step to the second graphical element; and providing a user-selectable element on the GUI to collapse overlapping portions of the direct graphical connection and the second direct graphical connection into a single direct graphical connection displayed in the process diagram.

14. The method of claim 1, wherein the information is executable by the client computer system to transmit the generated process diagram information to the computer system.

15. The method of claim 14, further comprising executing, by a process diagram engine at the computer system, the process diagram information in response to a request or a trigger event.

16. The method of claim 1, wherein the information executable by the client computer system includes rules for the autolayout environment, and wherein the rules for the autolayout environment define locations available for placement of the graphical elements and available paths for routing the graphical connections between the graphical elements in the graphical representation.

17. The method of claim 1, wherein the process diagram is for a process flow that executes the plurality of process steps according to the ordered relationship between the plurality of process steps.

18. The method of claim 17, wherein the at least one of the rules is that the process step associated with the available graphical element is upstream of the first process step in the process flow.

19. The method of claim 1, wherein the information is executable by the client computer system to:

receive, via the GUI, a selection by a user to implement a second direct graphical connection going from a third graphical element associated with a third process step;

enable, for selection by the user on the GUI, one or more graphical elements available for the second direct graphical connection;

receive, via the GUI, a selection by the user of one of the available graphical elements as a fourth graphical element associated with a fourth process step; and update the graphical representation of the process diagram with a route for the second direct graphical connection from the third graphical element to the fourth graphical element.

* * * * *

UNITED STATES PATENT AND TRADEMARK OFFICE
CERTIFICATE OF CORRECTION

PATENT NO. : 12,182,108 B2
APPLICATION NO. : 17/455180
DATED : December 31, 2024
INVENTOR(S) : Brady Sammons Page 1 of 1

It is certified that error appears in the above-identified patent and that said Letters Patent is hereby corrected as shown below:

In the Claims

In Column 22 (Claim 12), Lines 37-41, please delete "plurality of process steps and wherein the user input indicates an ordered relationship between the plurality of process steps in the process diagram;" and insert -- plurality of process steps and an ordered relationship between the process steps in the process diagram; --.

Signed and Sealed this
Fourth Day of February, 2025

Coke Morgan Stewart
*Acting Director of the United States Patent and Trademark Office*